United States Patent Office 3,737,478
Patented June 5, 1973

3,737,478
METHOD FOR MAKING POLYAMIDE ACID SALTS
AND PRODUCTS DERIVED THEREFROM
Edith M. Boldebuck, Schenectady, N.Y., assignor to
General Electric Company
No Drawing. Filed May 28, 1971, Ser. No. 148,154
Int. Cl. C08g 20/20
U.S. Cl. 260—78 UA                    17 Claims

ABSTRACT OF THE DISCLOSURE

A method is provided for converting a polyimide to the corresponding polyamide acid salt, utilizing a predetermined amount of a strong base. The polyamide acid salt can be converted to the corresponding polyamide acid. The polyamide acids and polyamide acid salts provided by the subject method can be converted to the polyimide state after being applied to various substrates by standard dip-coating and electrocoating techniques. When utilized with a potentiometric titrator, the method of the invention also can be used to determine imide functionality of polyimide.

Figure 1:
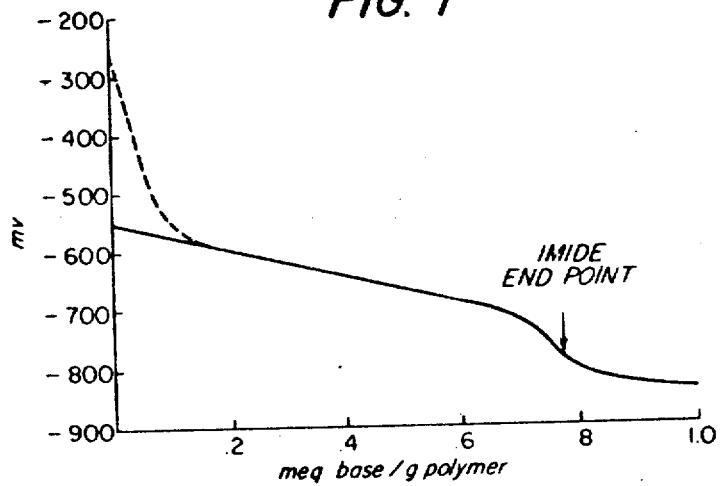

The present invention relates to a method of converting polyimide to the corresponding polyamide acid salt and to certain polyamide acids and salts made by such method.

As shown for example, by Edward's patent 3,179,614, polyamide acids can be made by reacting organic carboxylic acid dianhydrides and organic diamines. Edward's Patent 3,179,634, further teaches that such polyamide acids can be fabricated to the infusible state by the employment of heat. It is generally known that after the fabrication step, scrap polyimide is virtually useless. It cannot be further fabricated, and it has substantially reduced solubility in organic solvents. One method of salvaging scrap polyimide is by the degradation of the polymer backbone, such as shown by Izzard et al., Patent 3,529,017, showing the conversion of such polyimides derived from the reaction of organic dianhydrides and organic diamines to the corresponding organo carboxylic acid salts, and organic diamines by effecting the hydrolysis of the polyimide under severe conditions with excess caustic soda. Limited success with polyimides in fibrous form or in the form of fabrics also has been achieved. It has been found for example, that polyimide fabric can be more readily dyed if initially treated with an alkaline earth hydroxide. As a result of such treatment sites can be introduced along the polyimide backbone, suitable for introducing dyable aryloxypropanesulfonate units.

The present invention is based on the discovery that polyimides can be converted to useful polyamide acid salts without significant polymer degradation by contacting the polyimide with a base, such as an alkali hydroxide or a tetraalkyl ammonium hydroxide. Surprisingly, contrary to the teaching of the prior art, the polyimide backbone is not degraded, even though a strong base such as an alkali hydroxide is used. It has been found that effective results are achieved if a critical amount of base is employed. More particularly, base should be employed at a concentration which is sufficient to provide up to a value which does not substantially exceed one where the value is derived from the ratio of moles of available base to moles of imide functionality of the polyimide.

There is provided by the present invention, a method for salvaging polyimide values from polyimide by converting such polyimide values to polyamide acid salt values having from about .05 to about 1.0 meq. of polyamide acid salt radicals/g. polyimide, which comprises, adding a base to the polyimide at a temperature up to 150° C., while the polyimide is substantially dissolved in a solvent comprising an inert aprotic polar organic solvent, where the base is characterized by having an ionization constant greater than $10^{-2}$ in water at 25° C., and is employed in the resulting mixture at a concentration which is at least sufficient to neutralize any carboxy radicals which may be present, and provide a ratio of moles of base, per mole of imide functionality of the polyimide having a value of from about .01 to about 1.2.

Included by the polyimides which can be employed in the practice of the invention, are any polyimides which are at least partially soluble in an aprotic polar organic solvent, as defined hereinafter. The polyimides can have imide functionality in the polymer backbone, or in the pendant position and include poly(aspartimide), poly(amideimides)s, poly(amideacidimide)s, poly(esterimide)s, etc.; polyimides containing functional units, or polymeric blocks of organo siloxane, polycarbonate, polysulfone, polyurethane, etc., substituted with radicals such as, organo silyl, alkoxy, etc. Other examples, include polymers shown in Edward's Patents 2,710,853, 2,867,609, and 3,179,634. Additional examples of the aforementioned polyimides are shown in Patents 3,179,635, 3,264,250, 3,493,540, and 3,536,670, 3,562,223, etc.; polyimides shown in patents assigned to the same assignee as the present invention, such as Holub 3,325,450, Loncrini 3,360,-502, etc. also can be employed.

Some of the preferred imides which can be used in the practice of the invention can have chemically combined units such as, (1)
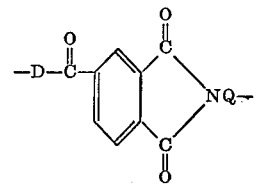

(2)
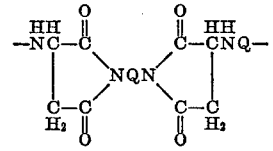

and (3)
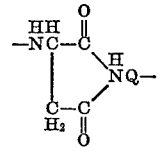

where Q is a divalent organo radical free of aliphatic unsaturation and D is a member selected from

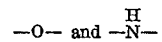

Some of the imides having units of Formula 1 are shown in copending application of Holub and Gaertner Ser. No. 40,802, filed May 27, 1970 and assigned to the same assignee as the present invention. As disclosed by Holub and Gaertner, polyimides can be made by heating the reaction products of organic diamines of the formula,

and a benzene carboxylic acid reactant selected from a 4-haloformylphthalic anhydride, or a mixture of a 4-haloformylphthalic anhydride and a bis-phthalolylhalide.

Polyimides having units of Formula 2, or a mixture of Formula 2 and 3 units, can be made by effecting reaction between organic diamines as defined above and maleic anhydride, as taught in Ger Offen 1,962,845, June 18, 1970. In addition, polyimides having units of Formula 1 can be made by the method of S Terney, J. Keating, and J. Zielinksi, Journal of Polymer Science, p. 686, vol. 8 (1970), by effecting reaction between diphenylmethane diisocyanate and trimellitic anhydride in N-methyl pyrrolidone.

In Formulas 1–3 above, Q is selected from divalent hydrocarbon, such as arylene, alkylene and radicals such as,

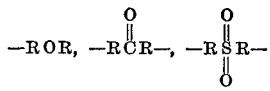

etc., where R is divalent hydrocarbon.

In addition to the above described polyimides, there also can be employed in the practice of the invention, polyimides which are made by the method shown by Klebe and Windish, copending application Ser. No. 838,322, filed July 1, 1969 now abandoned, and assigned to the same assignee as the present invention. As described by Klebe et al., various aromatic carbocyclic organic polymers, such as polystyrene, polyaryleneoxide, polycarbonate, polyester, can be imido alkylated with an imido alkylating agent of the formula, (4)

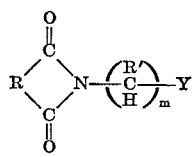

where R is a divalent organic radical selected from the class consisting of divalent hydrocarbon radicals and halogenated divalent hydrocarbon radicals, and R' is selected from hydrogen, monovalent hydrocarbon radicals, and halogenated monovalent hydrocarbon radicals, Y is a halogen or hydroxy radical, and $m$ is an integer having a value of from 1 to 4 inclusive.

Radicals included by R, are, for example, arylene radicals, such as phenylene, biphenylene, naphthylene, anthrylene, etc., alkylene radicals, such as ethylene, trimethylene, tetramethylene, etc., halogenated arylene and alkylene radicals such as chlorophenylene, chloronapathylene, chloroethylene, chlorotrimethylene, etc.; aliphatically unsaturated radicals such as,

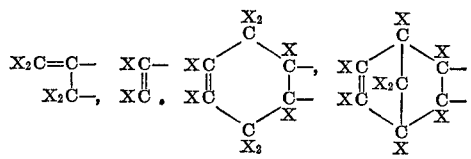

where X is the same or different radical selected from hydrogen, lower alkyl, halogen, such as chloro, methyl, ethyl, propyl, bromo, etc. Monovalent and hydrocarbon radicals included by R' are, for example, phenyl, chlorophenyl, methyl, ethyl, propyl, butyl, pentyl, hexyl, heptyl, octyl, etc.

As taught in the above identified application of Klebe and Windish, a Friedel Crafts catalyst, such as boron trifluoride is employed to imidoalkylate various aromatic carbocyclic organic polymers as previously defined. These polyimides have aromatic carbocyclic radicals occurring in either the pendant position, such as polystyrene, or the polymer backbone, such as polyaryleneoxide, polycarbonate, polyester, etc., substituted with imidoalkyl radicals of the formula, (5)

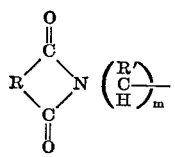

where R, R' and $m$ are as previously defined. Included among the imidoalkyl substituted aromatic carbocyclic polymers having imidoalkyl radicals of Formula 5 are organic polymers selected from "backbone" polymers of the formula, (6)

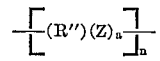

and "pendant" polymers of the formula, (7)

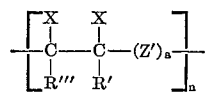

where R'' is a polyvalent organo radical, such as an aromatic carbocyclic radical having from 6 to 18 carbon atoms, R''' is a monovalent aromatic carbocyclic radical having from 6 to 18 carbon atoms, X is as previously defined, Z and Z' are divalent organo connectives defined below, $\alpha$ is a whole number equal to 0 or 1, and $n$ is an integer having a value of from 1 to 1,000 inclusive.

Radicals included by R'' of Formula 6 are phenylene, tolylene, xylylene, naphthylene, anthrylene, etc.; halogenated derivatives of such aromatic carbocyclic radicals, alkylated derivatives of such aromatic carbocyclic radicals; a mixture of such aromatic carbocyclic radicals, or derivatives of such aromatic carbocyclic radicals, and other polyvalent hydrocarbon radicals or halogenated polyvalent hydrocarbon radicals, which mixture contains at least about 1 percent and preferably about 10 mole percent to 99 mole percent of such aromatic carbocyclic radicals or derivatives thereof and up to 99 mole percent, and preferably up to about 90 mole percent of divalent radicals such as alkylene radicals, for example, methylene, ethylene, trimethylene, etc., halogenated derivatives thereof, etc.

Radicals included by R''' of Formula 7 are, for example, phenyl, tolyl, xylyl, naphthyl, anthryl, etc.; halogenated derivatives of such monovalent aromatic carbocyclic radicals; alkylated derivatives of such monovalent carbocyclic radicals; a mixture of such aromatic carbocyclic radicals, and other monovalent hydrocarbon radicals or halogenated hydrocarbon radicals, which mixture contains at least about 1 mole percent and preferably 10 mole percent to 99 mole percent of such aromatic carbocyclic radicals, or derivatives thereof, and up to about 99 mole percent and preferably up to 90 mole percent of monovalent radicals such as alkyl radicals, for example, methyl, ethyl, propyl, butyl, etc.; halogenated derivatives thereof, etc. In Formula 6, Z is a polyvalent organo connective such as,

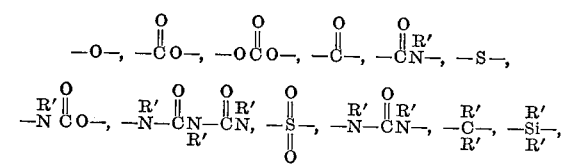

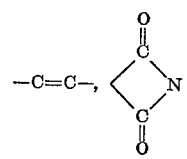

etc., and mixtures thereof; Z' in Formula 7 is a divalent organo connective, such as

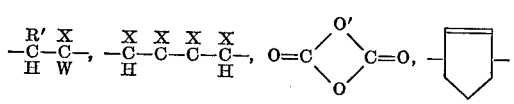

etc., Q' is a polyvalent aliphatic radical.

The bases which can be employed in the practice of the invention are any organic or inorganic bases having an ionization constant greater than $10^{-2}$, and preferably greater than $10^{-1}$ in water at 25° C. There can be employed bases included by the formula,

MOH where M is a member selected from alkali metal ions and tetraorgano ammonium ions. In instances where M is alkali metal, M also can be chemically combined with —OG radicals where G is selected from alkyl radicals and aryl radicals. Included by the bases which can be employed are for example, alkali metal hydroxides, such as sodium, potassium, lithium, etc.; tetraalkyl ammonium hydroxides, such as tetramethyl, tetrabutyl, etc., alkoxides, such as sodium methoxide, potassium ethoxide, etc., phenoxides, such as sodium phenoxides, potassium phenoxides, etc. In addition, organic bases such as guanidine etc., and alkali metal salts of weak acids having acid dissociation constants of $10^{-7}$ or less, which produces alkali metal hydroxides in situ in aqueous solutions also can be employed.

The polar organic solvents which can be employed in the practice of the invention are preferably polar aprotic solvents chemically inert to the reactants during the practice of the invention. Some of the solvents which can be employed are for example, N,N-dimethylformamide, N,N-dimethylacetamide, N,N-diethylformamide, N,N-diethylacetamide, N,N-dimethylmethoxy acetamide, N-methyl caprolactam, dimethylsulfoxide, N-methyl-2-pyrrolidone, tetramethyl urea, pyridine, dimethylsulfone, tetramethylene sulfone, N-methylformamide, N-acetyl-2-pyrrolidone. In addition, other diluent solvents substantially inert during the practice of the method can also be utilized, such as aliphatic hydrocarbons, alcohols, ethers, etc.

An additional feature of the present invention is directed to the polyamide acid salts and polyamide acids which can be derived in accordance with the practice of the invention from polyimides having radicals of Formulas 2, 3 and 5. Some of these polyamide acid salts are aromatic carbocyclic polymers consisting essentially of units of Formulas 6 or 7 above, substituted with amide acid salt radicals of the formulas, (8) 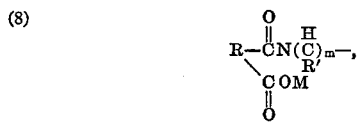

where R, R', M and m are as previously defined. Additional polyamide acid salts can be derived from polyimides having chemically combined units of Formulas 2 or 3 in accordance with the method of the invention, which can have units included by the formulas (9) 

(10) 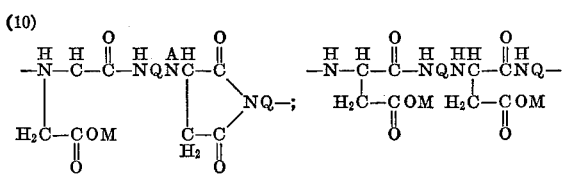

where Q is as previously defined.

Include by the polyamide acid salts having radicals of Formula 8 which are provided by the invention are, for example, aromatic carbocyclic backbone polymers, such as polyaryleneoxides having chemically combined units of the formula,

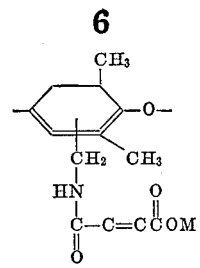

aromatic carbocyclic pendant polymers, such as polystyrene having chemically combined units of the formula,

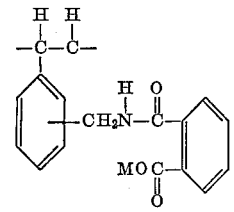

etc.

In addition to the above described polyamide acid salts, there is also provided by the present invention, polyamide acids substituted with radicals of the formula,

(11) 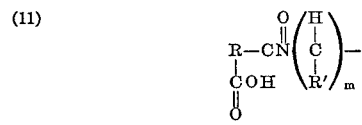

which can be made by treating the corresponding polyamide acid salts having radicals of Formula 8, with an ion exchange resin, or by precipitation in acidic media in accordance with the methods known to the art.

Additional polyamide acids which are included in the present invention can have units of the formulas,

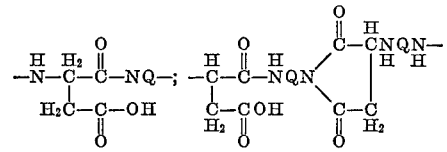

etc., which can be derived in accordance with the present invention from polyamide acid salts having units of Formulas 9 and 10 or mixtures thereof, where Q is as previously defined.

In the practice of the method of the present invention, a predetermined amount of strong base is added to polyimide in the presence of polar organic solvent. The amount of base added should be sufficient to effect the conversion of at least one, and up to the total amount of the imide radicals in the polyimide to the corresponding polyamide acid salt.

Figure 2:
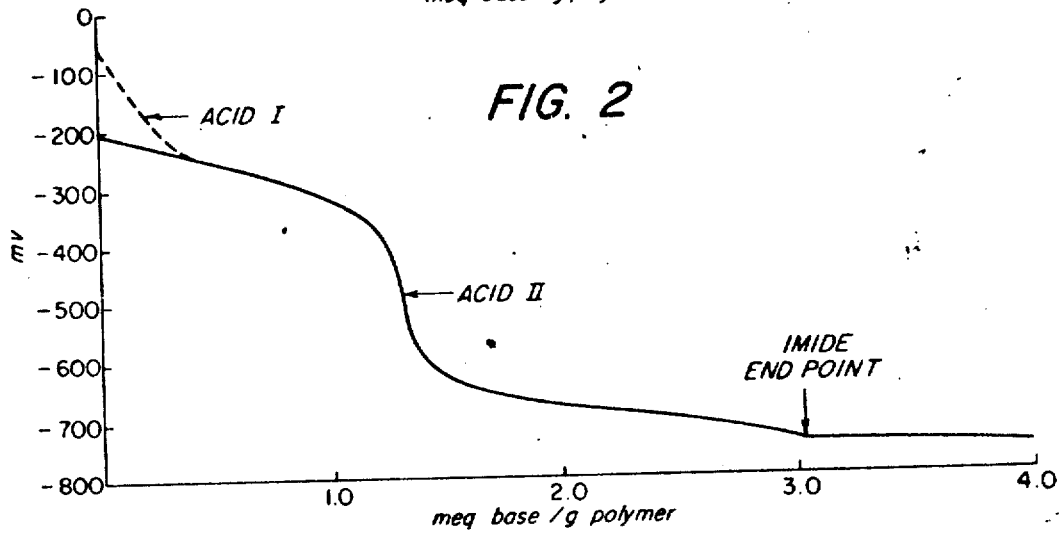
Figure 3:
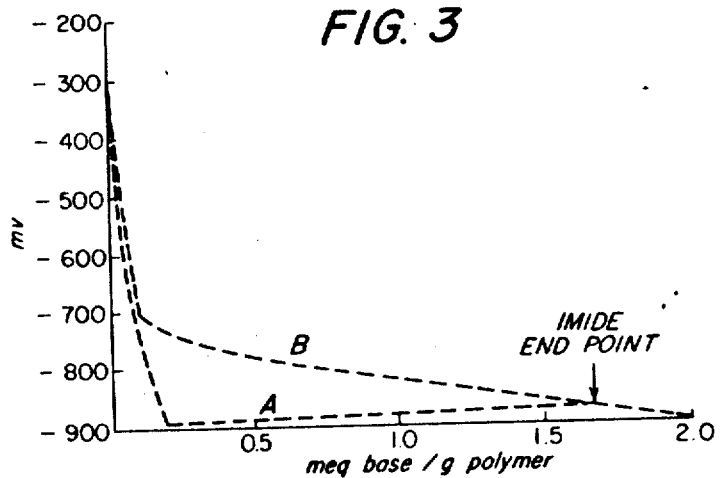

The employment of excessive amounts of base must be avoided to minimize polymer degradation. It has been found desirable to know the imide functionality of the polyimide before the base is added to the polyimide-organic solvent mixture. In instances where imide is employed having chemically combined imide and non-imide nitrogen, ordinary techniques used for determining total nitrogen, such as the Kjeldahl method are not satisfactory for distinguishing imide nitrogen from non-imide nitrogen. A convenient way of determining imide functionality in polyimide which can distinguish imide and non-imide nitrogen is by employing a potentiometric titrator. A titration curve can be plotted as shown by FIGS. 1–3, depending upon the type of polyimide used in the titration, and an end point in meq. of base consumed will indicate the nature of the polyimide.

The titration curve of FIG. 1, for example, can be obtained when titrating with base utilized in the practice of the invention to determine imide functionality in a polyimide having chemically combined non-imide nitrogen such as polyamideimide.

In instances where the polyimide has free carboxy radicals on the polymer chain, such as amide acid groups, base concentrations sufficient for the neutralization of these carboxy radicals, in addition to imide ring opening should be employed. As shown in FIG. 2, neutralization of the carboxy radicals, will proceed prior to the stage at which ring opening of the imide groups will occur.

In instances where the polyimide contains only chemically combined imide nitrogen, for example, aromatic carbocyclic polymers of Formulas 6 or 7 substituted with radicals of Formula 5, a standard nitrogen analysis for weight percent nitrogen, such as the Kjeldahl method can be employed, or optionally potentiometric titration can be used employing base utilized in the practice of the present invention. As shown by the curve in FIG. 3, if the total base used is added in increments, two titration curves, Curve A and Curve B can result. Curve A shows the initial reading, after each increment, of base is added, while Curve B shows the results obtained after a time dependent drift-back associated with slow consumption of base to form salt has stabilized.

More particularly, FIG. 1 further illustrates how potentiometric titration can be used to determine imide functionality, in a polyimide free of carboxy radicals and containing non-imide nitrogen, such as found in a polyamide-imide. The abscissa shows meq. of base, per gram of polyimide, and the ordinate is expressed in millivolts. The dotted line indicates how a typical curve would appear which had a trace acid as an impurity. Normally, the solid line shows the relationship between the results obtained by adding base to the mixture and shows the end point. Total imide functionality can be calculated directly from the curve at the end point, which corresponds to complete neutralization of the amide acid generated.

Knowing the weight of the sample in grams, the total moles of imide can be readily calculated in the sample utilized by the following relationship:

$$\frac{\text{cc. of base} \times \text{normality of base}}{\text{weight of polymer sample}}$$

The weight of polymer associated with one equivalent of functional group also can be calculated by the formula:

$$\frac{1000}{\text{meq. of functional group/gram of polymer}}$$

FIG. 2 is more particularly a typical curve obtained from a polyimide having available carboxy radicals, such as normally present in a polyamide acid which is either partially or substantially imidized. Again the dotted line on the curve indicates the typical showing of a polyamide acid having a trace of a strong acid impurity, which is shown as Acid I. Acid II is shown at the point of complete neutralization of the amide acid. The final inflection in the curve shows the point at which the complete conversion of the imide functionality in the polyimide to the amide acid salt has been effected. Total moles of imide, as well as the total moles of carboxy in the polyamide acid can readily be calculated by using the above relationships.

FIG. 3, is a curve obtained by titrating certain polyimides having chemically combined radicals of Formulas 1-3 or 5, including phthalimidomethyl substituted polystyrene or polyaryleneoxide. Curves A and B in FIG. 3, show a time dependent relationship of the effects of added increments of strong base to the polyimide. Drifting back from Curve A to Curve B occurs upon the conversion of the imide functional group to the amide acid salt. The cycle is repeated after each stabilization had been effected until the end point is achieved establishing that there has been an amount of titrant employed sufficient to provide up to about one mole of base, per mole of imide. It also has been found that certain polyimide having units of Formula 5, such as polymers of Formulas 6 and 7 substituted with maleimidomethyl radicals can produce potentiometric curves resembling FIG. 1.

There is also provided by the present invention, electrocoating compositions of polyamide acid salt compositions having chemically combined units of Formulas 8, 9, and 10 or mixtures thereof, organic solvent and water which can be in the form of a dispersion or solution. These electrocoating compositions can have from about 0.5% to about 15% solids based on the weight of mixture. The liquid phase can comprise from about 10 to 90% water and from 90% to 10% by weight of organic solvent, as previously defined. There can be from about 5 mole percent to 100 mole percent of units of Formula 8, 9 or 10, respectively, based on the total moles of such units, and units of Formula 2 or 3 or 5, respectively in the polyimide.

In order that those skilled in the art will be better able to practice the invention, the following examples are given by way of illustration and not by way of limitation. All parts are by weight.

EXAMPLE 1

A polyimide was prepared from equal molar amounts of a N,N'-4,4-diphenylmethane bismaleimide and bis(4-aminophenyl)methane, in accordance with the teaching of U.S. Patent 3,562,223, Bargain et al. Based on method of preparation, the resulting polyimide had 3.605 milliequivalents, or meq. of imide, per gram of sample.

The above polyimide was then titrated, to determine the meq. of imide, per gram of sample. A 0.15% solution of the polymer in dimethyl formamide was titrated potentiometrically with methanolic tetrabutyl ammonium hydroxide. There was employed a Beckman Zeromatic pH meter, a glass electrode, and a calomel electrode modified with saturated methanolic potassium chloride solution. After each increment of base, the meter indicated a large millivolt change, which then slowly drifted back to a lesser millivolt reading and stabilized. The end point obtained indicated 3.61 meq. of imide, per gram of sample. This result compared favorably with the theoretical of 3.605.

A solution was prepared from the above polyimide, utilizing 1.252 parts of polymer, per 23.19 parts of N-methyl pyrrolidone. To this solution there was added 0.12 part of tetrabutyl ammonium hydroxide in the form of a methanolic solution. After 5 minutes 7.226 parts of water was slowly added to the mixture with stirring. A small amount of coagulation was observed and an additional 7.276 parts of N-methyl pyrrolidone was added to redissolve the polymer. An additional 0.667 part of water was added to produce a slightly hazy stable solution. Based on method of preparation, the mixture was a solution of a polyamide acid salt having chemically combined units of the formula,

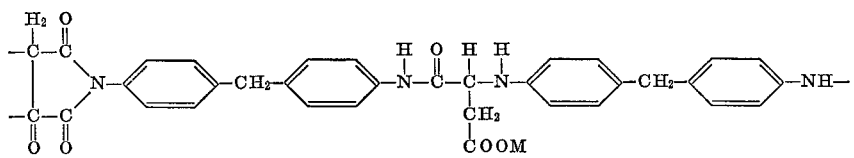

where M is a tetrabutylammonium ion.

Employing a 1" wide copper foil anode, and a 1" wide platinum foil cathode, at a ½" separation, there was passed a 40 ma. constant current through the above electrocoating composition for 1 minute using the aforementioned electrodes at a 1″ immersion. There was obtained 0.1838 part of wet film on the anode, which was heated for 1 minute at 125° C. and 5 minutes at 250° C. A solvent-free polyimide coating, weighing 0.0205 part was obtained. It was light brown in color, glossy and adherent. Where the copper foil was bent and creased, the film did not crack. The weight of a comparable dip coating film after the same cure, was 0.0004 part. The valuable insulating characteristics of the film are established by utilizing it as an electrode in a dilute solution of hydrochloric acid. It is found that the surface of the film is free of bubbles showing that there is no current flowing.

A solution also was prepared of the polymer made in accordance with the above described Bargain et al., except that no base was added. No electrodeposit was obtained when a 40 ma. current was passed through the mixture following the same procedure.

EXAMPLE 2

A polyaryleneoxide having chemically combined 2,6-diphenylphenoxy units substituted with phthalimidomethyl radicals was dissolved in dimethyl formamide, utilizing one part of polymer, per 36.75 parts of solvent. Based on the titration method of Example 1, the polyimide had about 52 mole percent of such phthalimidomethyl substituted phenoxy units, based on the total moles of phenoxy units in the polyaryleneoxide. The polyaryleneoxide was made by the above described method of Klebe as shown in copending application Ser. No. 838,322, utilizing phthalimidomethyl chloride as an imido alkylating agent. To the aforementioned solution there was added 0.8 millimole of tetrabutyl ammonium hydroxide dissolved in methanol and the mixture was stirred for 15 minutes. There was then added 12.52 parts of water, resulting in a faint haze. Based on method of preparation, there was obtained a solution of a polyaryleneoxide having chemically combined polyamide acid salt units of the formula,

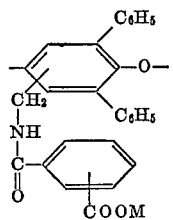

where M is a tetrabutyl ammonium ion.

The above mixture was electrocoated in accordance with the procedure of Example 1, utilizing copper and aluminum anodes. A 20 ma. DC current was passed through the mixtures for 2 minutes. Wet deposits were obtained as follows, which were heated at 125° C. for 5 minutes, and 250° C. for 5 minutes.

|  | Wet deposit (g.) | Cured film (g.) |
| --- | --- | --- |
| Copper | .5172 | .0257 |
| Aluminum | .5132 | .0221 |

The above films were found to possess valuable insulating characteristics when subjected to the conductivity test described in Example 1.

The above procedure was repeated with the same polyaryleneoxide solution, except no base was added. It was found that the solution could not be electrocated.

EXAMPLE 3

A phthalimidomethyl substituted poly(2,6 - dimethylphenyleneoxide) was prepared in accordance with the above defined Klebe method. Based on a Kjeldahl weight determination, the nitrogen analysis of the polymer was found to be 2.37%.

The polymer was titrated in accordance with the above described procedure of Example 1, using a 0.33% solids solution and tetrabutyl ammonium hydroxide. Based on the titration, the polymer had 1.67 meq. of imide, per gram of polymer. This indicated there was 593 grams of polymer, per imide functionality or a nitrogen weight per content of 2.36%. Based on method of preparation, and the nitrogen content of the polymer the mixture was a solution of a poly(phenyleneoxide) having 100 mole percent of chemically combined amide acid units of the formula,

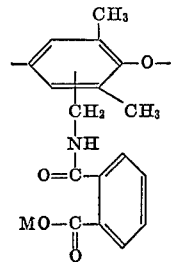

where M is a tetrabutyl ammonium ion.

An electrocoating solution was made from the above phthalimidomethyl substituted polyphenyleneoxide, consisting of 2% by weight of polymer solids, 76% of dimethylformamide, and about 22% by weight of water. There was added to the solution a sufficient amount of tetrabutyl ammonium hydroxide to convert 27 mole percent of the phthalimidomethyl groups to amide acid salt groups. Based on the calculation that the polymer had 27 mole percent of chemically combined amide acid salt groups, its equivalent weight was 2200 grams, per amide acid salt group.

There was passed 10 ma. constant current for 1 minute through the above electrocoating mixture, which was equivalent to 0.6 coulomb. The amount of polymer solids deposited on the copper anode weighed 0.0139 part after removal of solvent by heating the film for 5 minutes at 250° C. This indicated that its equivalent weight was 2300 grams, or there was 2300 grams of polymer deposited per Faraday.

EXAMPLE 4

A polyamideimide containing free carboxy radicals was made by effecting reaction of 0.45 mole methylene dianiline and 0.50 mole trimellitic anhydride in a 1 to 1 N-methylpyrrolidone xylene blend. The mixture was heated to a temperature of 225° C. with stirring until approximately the theoretical amount of water was collected. Additional N-methyl pyrrolidone was added to produce a mixture having 51% solids.

There was added 47.2 parts of p,p'-diphenylmethane diisocyanate dissolved in 100 parts of N-methylpyrrolidone to about 325 parts of the above mixture, which was then heated up to 180° C. and diluted with 181 parts N-methylpyrrolidone. There was obtained a polyamideimide, having 0.52 meq. carboxy groups, and 2.38 meq. of imide groups per gram of polymeric solids, as determined by potentiometric titration.

The above polyamideimide was dissolved in N-methyl pyrrolidone to produce a solution having 1½ parts of polymer and 39 parts of solvent. There was initially added sufficient aqueous sodium hydroxide to neutralize the free carboxy radicals in the mixture. There was then added 9 parts of water to the mixture, which caused agglomeration of the polymer. Additional N-methyl pyrrolidone was then added to produce a clear solution containing 2.4% polymer, 83.4% N-methyl pyrrolidone and 14.2% water. An attempt was made to electrocoat this solution and it was found that electrodeposition of the polymer did not occur utilizing the apparatus and procedure of Example 1.

The same polyamideimide solution was prepared by the above procedure. There was then added 1.62 meq. of sodium hydroxide to the mixture. This concentration was sufficient to completely neutralize all free carboxy radicals, and convert about 30 mole percent of the available imide groups to amide acid salt groups. The resulting mixture containing 1½ parts of polymer dissolved in 39 parts of N-methyl pyrrolidone. In addition, to the added amount of base as previously described, water was then added to the mixture to produce a mixture having by weight 2½% polymer, 64.1% N-methyl pyrrolidone and 33.4% water. The solution was then employed in the electrocoating apparatus of Example 1, and the electrocoating of the mixture was repeated. When a 40 ma. constant current was employed for 1 minute, utilizing an aluminum anode, .018 part of polymer was obtained on the anode after removal of solvent. The resulting polyimide film was found to exhibit valuable insulating properties.

EXAMPLE 5

A polyamideimide substantially free of free carboxy radicals was made by reacting diphenylmethane diisocyanate and trimellitic anhydride in a mixture of N-methyl pyrrolidone and dimethyl acetamide in accordance with the method of S. Terney, J. Keating and J. Zielinski, Journal of Polymer Science, p. 686, vol. 8 (1970). By titrating potentiometrically with tetrabutyl ammonium hydroxide, the polymer solution was found to contain 0.767 meq. of imide per gram of solution, and less than 0.04 meq. of free carboxy radicals. The polymer solids content was .268 g. per gram of solution.

After the exact imide functionality of the dissolved polyamideimide was determined as described above, it was possible to prepare a polyamide acid salt of the polyamideimide. Accordingly, there was added to 18.63 parts of the polymer solution an additional 48 parts of N-methyl pyrrolidone and sufficient meq. of aqueous sodium hydroxide to completely convert imide functionality to amide acid salt functionality. The specific resistivity of the solution was found to be 1140 ohm centimeter.

An organic strong acid cation exchange resin in the form of sulfonated polystyrene copolymer in the hydrogen form, having an exchange capacity of 2.29 meq. per gram, was washed 5 times with distilled water, then washed 3 times with dry N-methyl pyrrolidone. There was then added 9.4 parts of the washed ion exchange resin to the above polyamide acid salt solution. The resulting mixture was stirred for 30 minutes and filtered. There was obtained a clear polyamide acid solution having a specific resistance of 8900 ohm centimeter.

An electrocoating composition was made from the above described polyamide acid, by the addition of ammonium hydroxide in an amount sufficient to neutralize 80% of the amide acid groups in the resulting polymer solution. This polyamide acid ammonium salt composition was compared to an electrocoating composition of the same polyamideimide reacted with the same meq. of sodium hydroxide in place of ammonium hydroxide. When both compositions were employed in the electrocoating apparatus of Example 1, it was found that essentially identical results in terms of electrodeposited films on copper were obtained. These results are shown in the following table, Na is the polyamide acid sodium salt, and $NH_4$ is the polyamide acid ammonium salt.

|   | Grams of polymer deposited | Wt. percent of polymer in deposit |
|---|---|---|
| Na | .012 | 19 |
| $NH_4$ | .010 | 18 |

The above tests were made utilzing a copper anode, and a constant current of 40 ma. for 1 minute.

EXAMPLE 6

A phthalimidomethyl substituted polystyrene was made in accordance with the above described Klebe method, utilzing phthalimidomethyl chloride, boron trifluoride, and polystyrene. The resulting polymer was titrated as a 0.1% solution in dimethyl formamide with tetrabutyl ammonium hydroxide. The polymer was found to have about about 1.99 meq. imide groups, per gram of polymer.

A polyamide acid salt composition was prepared from the above polyimide. Tetrabutyl ammonium hydroxide was used in amounts sufficient to convert all of the imide groups of the polyimide to the corresponding polyamide acid salt groups. Based on method of preparation, there was obtained a solution of a polyamide acid salt having about 30 mole percent of chemically combined units of the formula,

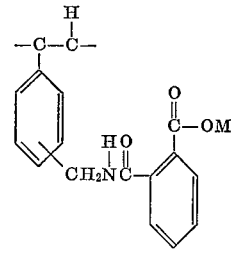

where M is a tetrabutyl ammonium ion.

The above solution was then acidified with glacial acetic acid and the total mixture was then added to a large excess of water. The pH of the resulting aqueous phase was approximately 7. A flocculent precipitate was obtained which was filtered, washed several times with water, filtered again and then dried in air for several hours. Based on method of preparation, the product was a polyamide acid substituted polystyrene, having about 30% of the styrene rings substituted with polyamide acid units in the form of a polyamide acid phthalamido methyl units of the formula,

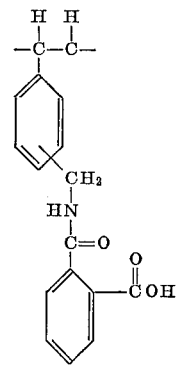

The above polyamide acid was dissolved in dimethyl formamide, and analyzed for polyamide acid content and imide content. It was found that the polymer was free of imide groups and contained about 1.14 meq. of imide acid groups per gram of polymer. The polyamide acid was neutralized with ammonium hydroxide and the resulting solution was electrocoated utilizing the apparatus of Example 1. There was obtained an electrodeposit of material which produced a polyimide exhibiting valuable insulating properties when the copper anode having the electrodeposited product was heated as in Example 1.

EXAMPLE 7

A polyarylene oxide consisting essentially of chemically combined 2,6-diphenylphenoxy units and substituted with phthalimidomethyl radicals was prepared by the above described method of Klebe. The phthalimidomethyl substituted polyarylene oxide was titrated in dimethylformamide in accordance with the present invention to determine its imide content using tetrabutyl ammonium hydroxide. The polymer was found to have 1.4 meq. of imide groups, per gram of polymer.

Two parts of the above polyimide was dissolved in 38 parts of dimethyl formamide. There was added all at once to the resulting solution, sufficient tetrabutyl ammonium hydroxide in the form of a 1 normal methanolic solution to completely convert the polyimide to the polyamide acid salt state. The pH of the resulting mixture was approximately 8. Based on method of preparation there was obtained a solution of a poly(aryleneoxide) having chemically combined units of the formula,

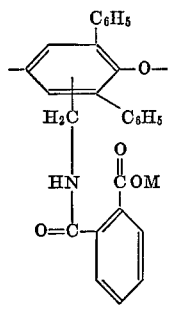

where M is a tetrabutyl ammonium ion.

A portion of 1 N aqueous hydrochloric acid was added with stirring to produce a mixture having a pH of about 6.5. The mixture was then poured into a large volume of water. A finely divided gelatinous precipitate resulted which was filtered under suction and washed several times with water, to produce a slightly damp product. Based on method of preparation the product was a poly-aryleneoxide having chemically combined polyamide acid units of the formula,

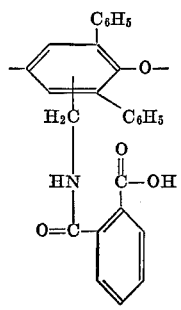

The above polyamide acid was neutralized with ammonium hydroxide. The resulting polyamide acid ammonium salt solution was then electrocoated onto a copper anode. When the copper anode was heated, as described in Example 1, a polyimide film was obtained exhibiting valuable insulating properties.

EXAMPLE 8

A maleimidomethyl substituted polystyrene was made by the above described method of Klebe utilizing maleimidomethyl chloride as an imidoalkylating agent. The polymer was found to contain 0.189 meq. of imide groups per gram of polymer, employing the method of Example 1.

One part of the above maleimidomethyl substituted polystyrene was dissolved in 50 parts of dimethyl formamide. There was then added methanolic tetrabutyl ammonium hydroxide in amounts with stirring, to convert the polyimide to the corresponding polyamide acid salt. A characteristic deep red solution resulted. Based on method of preparation, there was obtained a polystyrene having chemically combined units of the formula,

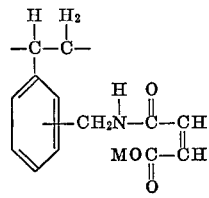

where M is a tetrabutyl ammonium ion.

There was added to the mixture, 35 parts of water. The mixture was electrocoated and a polyimide film was made on copper and aluminum anodes, exhibiting valuable insulating characteristics.

EXAMPLE 9

The polyamideimide prepared in Example 4, dissolved in N-methyl pyrrolidone, having a 0.52 meq. carboxy/gram of polymer, and 2.38 meq. imide per gram of polymer was used to prepare a series of electrocoating compositions employing alkali metal alkoxides, alkali metal phenoxides and alkali metal salts of weak acids. Each of the electrocoating compositions were prepared with 4½ parts of a 27.6% polymer solution which was adjusted to 3.7% of polymer solids in N-methyl pyrrolidone prior to the addition of base and dilution with water. The following table shows the base employed in each composition and the ingredients of the compositions expressed in percent by weight of polymer, solvent, and moles of base/gram of polymer.

ELECTRODEPOSIT ON ALUMINUM

| Base | Wet weight | Cured film weight |
|---|---|---|
| (A) Sodium ethoxide | .243 | .012 |
| (B) Sodium phenoxide | .154 | .011 |
| (C) Sodium carbonate | .104 | .013 |
| (D) Sodium carbonate | .139 | .018 |
| (E) Sodium bicarbonate | .147 | .018 |
| (F) Trisodium phosphate | .249 | .037 |
| (G) Sodium hydroxide | .071 | .020 |

ELECTROCOATING COMPOSITIONS

| Base | Weight percent | | | | Millimoles base per g. polymer |
|---|---|---|---|---|---|
| | Polymer | NMP | Water | Alcohol | |
| (A) Sodium ethoxide | 2.5 | 66 | 18.5 | 13.0 | 1.98 |
| (B) Sodium phenoxide | 2.5 | 58 | 32.4 | 7.1 | 1.98 |
| (C) Sodium carbonate | 2.5 | 64.8 | 32.7 | | 2.17 |
| (D) Sodium carbonate | 2.5 | 65.1 | 32.4 | | 1.10 |
| (E) Sodium bicarbonate | 2.5 | 65.1 | 32.4 | | 1.14 |
| (F) Trisodium phosphate | 2.5 | 64.9 | 32.6 | | 1.52 |
| (G) Sodium hydroxide | 2.5 | 65.0 | 32.5 | | 1.08 |

There also is provided by the present invention, electrocoating compositions comprising polyamide substantially free of carboxy radicals, which have about 0.1 to about 1 meq. of polyamide acid salt radical per gram of polymer. These electrocoating compositions exhibit superior shelf life stability and provide a high weight of polymer deposit per coulomb of electrical charge, referred to sometimes as "coulomb yield." The term "shelf life stability" as used hereinafter, will signify the ability of the electrocoating composition to resist change over at least a 5 day aging period. Change can be measured with respect to percent change in weight percent solids of the electrodeposit after the shelf period. A change of 50% or greater in weight percent of polymer solids indicates that the electrocoating compositions are unsuitable for providing polyimide coatings on the conducting substrate. Experience has shown that polyimides having polyamide acid salt radicals within the above defined range can not be employed to make electrocoating compositions having satisfactory shelf stability if the polyimide has a substantial amount of free carboxy radicals.

In making the polyimide electrocoating compositions of the present invention, exhibiting both high coulomb yield and satisfactory shelf stability over an extended period of time, there must be employed polyimide substantially free of carboxy radicals or polyimide having carboxy radicals present at up to about 0.8 meq. of carboxy radicals/gram of polyimide. The weight percent of solids and solvent in these electrocoating compositions are the same as the electrocoating compositions previously described.

In order that those skilled in the art will be better able to practice this aspect of the present invention, the following example is given by way of illustration and not by way of limitation. All parts are by weight.

EXAMPLE 10

Polyimide A was prepared in accordance with the method of Example 9, having 2.53 meq. of imide per gram of polymer, and substantially free of carboxy radicals. In addition to polyimide A, there also was prepared polyimide B by effecting reaction between equal molar amounts of chloroformal phthalic anhydride and methylene dianiline. Polyimiide B had 1.29 meq. of free acid groups per gram of polymer and 1.49 meq. of imide groups per gram of polymer. Polyimide A also had an intrinsic viscosity of 0.31 g./dl. and polyimide B had an intrinsic viscosity of 0.34 g./dl. when measured under the same conditions.

Electrocoating compositions were prepared from the above polyimides utilizing the same weight proportions of polyimide, aqueous sodium hydroxide, water and N-methyl pyrrolidone. The respective electrocoating compositions contained by weight about 4.3% polymer solids, 63.4% of N-methyl pyrrolidone and 32.2% of water. In solutions A and B, prepared from polyimide A and B respectively, there were approximately 0.53 meq. of sodium carboxylate radicals per gram of polymer. Solution A, however, had no free carboxy radicals and 2.01 meq. of imide per gram of polymer. Solution B had 0.77 meq. of carboxy radicals and 1.49 meq. of imide per gram of polymer.

The above electrocoating solutions were employed to electrodeposit polyimide onto aluminum anodes, employing a current density of 20 ma. per square inch for 1 minute. Electrodeposition was effected after each of the compositions had been freshly prepared and after a 5 day shelf aging period. It was found that both electrocoating solutions were substantially equivalent when freshly prepared with respect to providing about 0.17 part of wet deposit having 24% solids on the aluminum anode and 0.04 part of cured polyimide film on the aluminum anode. However, after a 5 day aging period, solution B provided an electrodeposit containing only 8% solids, indicating a significant change had taken place with respect to its electrocoating characteristics. Electrocoating solution A, however, remained unchanged after a 12 day aging period and for an indefinite time thereafter. There was obtained from solution A essentially the same weight of wet and dry electrodeposit after an extended aging as obtained when freshly prepared. This indicated that the electrocoating compositions of polymer B was unsuitable for electrocoating purposes because of the rapid change in weight percent of solids in electrodeposit. Experience has shown for example, that when the solids content of the electrodeposit drops below about 10%, that the conversion of the electrodeposit to the polyimide state is uneconomic, due to the solvent removal requirements. Those skilled in the art would know that the electrocoating solution A would be satisfactory for electrocoating purposes.

Although the above examples are limited to only a few of the polyamide acid salts, polyamide acids and electrocoating compositions provided by the present invention, it should be understood the present invention is directed to a much broader class of such materials as shown by Formulas 8–11 and method for making such materials. In addition, it should be understood that the present invention as directed to salts of the novel polyamide acids of the invention, as shown by Formula 11, which can be made with weak bases such as ammonia, organic amines such as ethanolamine, morpholine, tertiary organic amines, etc.

What we claim as new and desire to secure by Letters Patent of the United States:

1. A method for producing resinous polymer substantially free of carboxy radicals and having from 0.05 to 1.0 meq. of polyamide acid salt radicals per gm. of polymer from resinous polyimide substantially dissolved in a solvent comprising an inert aprotic polar organic solvent by converting such resinous polyimide to polyamide acid salt values, which comprises, adding a base to the polyimide at a temperature up to 150° C., while the polyimide is substantially dissolved in said solvent where the base is characterized by having an ionization constant greater than $10^{-2}$ in water at 25° C., and is employed in the resulting mixture at a concentration which is at least sufficient to neutralize any carboxy radicals which may be present and provide a ratio of moles of base, per mole of imide functionality of the polyimide having a value of from about .01 to about 1.2.

2. A method in accordance with claim 1, where the polyimide is an aromatic carbocyclic polymer substituted with radicals of the formula,

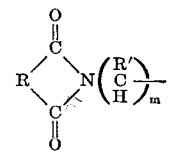

which are attached to aromatic nuclei of said polymer by carbon-carbon bonds, where R is a divalent hydrocarbon radical, R' is selected from hydrogen and monovalent hydrocarbon radicals, and $m$ is an integer having a value of from 1 to 4 inclusive.

3. A method in accordance with claim 1, where the polyimide is the product of reaction of an aliphatically unsaturated bisimide and an organic diamine.

4. A method in accordance with claim 1, where the polyimide is the reaction product of trimellitic anhydride and a difunctional organic compound selected from the class consisting of an organic diisocyanate and an organic diamine.

5. A method in accordance with claim 1, where the polyimide is the reaction product of an organic diamine and maleic anhydride.

6. A method in accordance with claim 1, where the polyimide is the reaction product of organic diamine and a bis-maleimide.

7. A method in accordance with claim 3, where the polyimide is a reaction product of N,N'-4,4'-diphenyl methane bismaleimide and bis(4-aminophenyl)methane.

8. A method in accordance with claim 2, where the aromatic carbocyclic polymer is a polyaryleneoxide.

9. A method in accordance with claim 2, where the imidoalkyl radical is maleimidomethyl radical.

10. A method in accordance with claim 2, where the imidoalkyl radical is phthalimidoalkyl radical.

11. A method in accordance with claim 2, where the aromatic carbocyclic polymer is polystyrene.

12. A method in accordance with claim 2, where the polyimide is a poly(2,6-diphenyl-phenoxy) ether substituted with maleimidomethyl radicals.

13. A method in accordance with claim 2, where the polyimide is a poly(2,6 - dimethylphenoxy)ether substituted with phthalimidomethyl radicals.

14. A method in accordance with claim 2, where the polyimide is a polystyrene substituted with phthalimidomethyl radicals.

15. A method in accordance with claim 2, where the polyimide is a polystyrene substituted with maleimidomethyl radicals.

16. A method in accordance with claim 1, where the base is tetraalkyl ammonium hydroxide.

17. A method in accordance with claim 1, where the base is an alkali metal compound.

References Cited

UNITED STATES PATENTS

| 3,242,136 | 3/1966 | Endrey | 260—78 TF |
|---|---|---|---|
| 3,528,937 | 9/1970 | Reynolds et al. | 260—78 TF |
| 3,529,017 | 9/1970 | Izard et al. | 260—515 P |

OTHER REFERENCES

Adrove et al.: Polyimides, A New Class of Heat Resistant Polymers, 1969, pp. 65–70.

Mark et al.: Man Made Fibers, Science and Technology, vol. 2, 1968, p. 387.

HAROLD D. ANDERSON, Primary Examiner

U.S. Cl. X.R.

204—56 R; 260—29.2 N, 29.6 R, 29.6 H, 29.6 HN, 47 CZ, 47 UA, 47 XA, 47 ET, 78 A, 78 TF, 93.5 A

UNITED STATES PATENT OFFICE
CERTIFICATE OF CORRECTION

Patent No. 3,737,478      Dated June 5, 1973

Inventor(s) Edith M. Boldebuck

It is certified that error appears in the above-identified patent and that said Letters Patent are hereby corrected as shown below:

Drawing omitted.

Please show drawing as attached.

Signed and sealed this 13th day of May 1975.

(SEAL)
Attest:

RUTH C. MASON
Attesting Officer

C. MARSHALL DANN
Commissioner of Patents
and Trademarks